Nov. 10, 1959   G. E. STOCKING   2,911,797
AIR CONDITIONING APPARATUS
Filed Nov. 10, 1958
FIG. 1
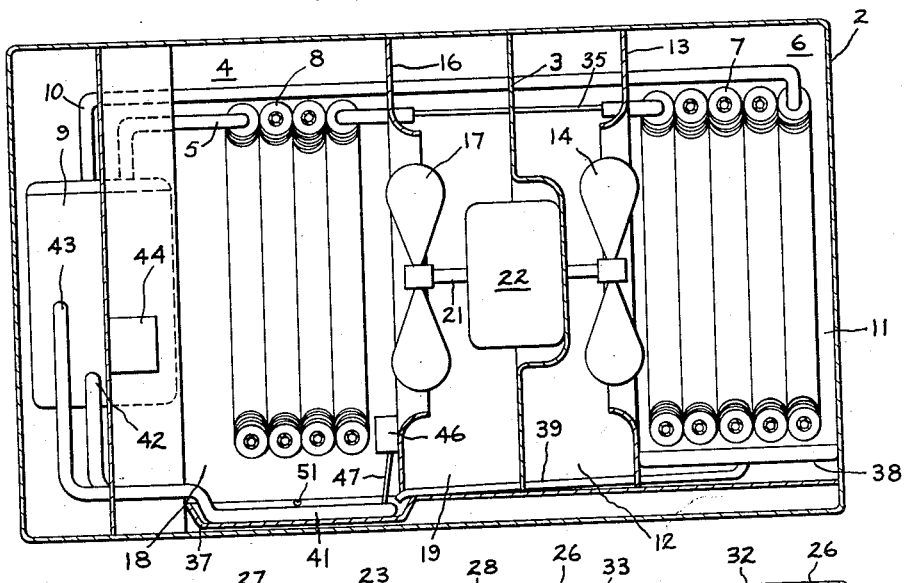
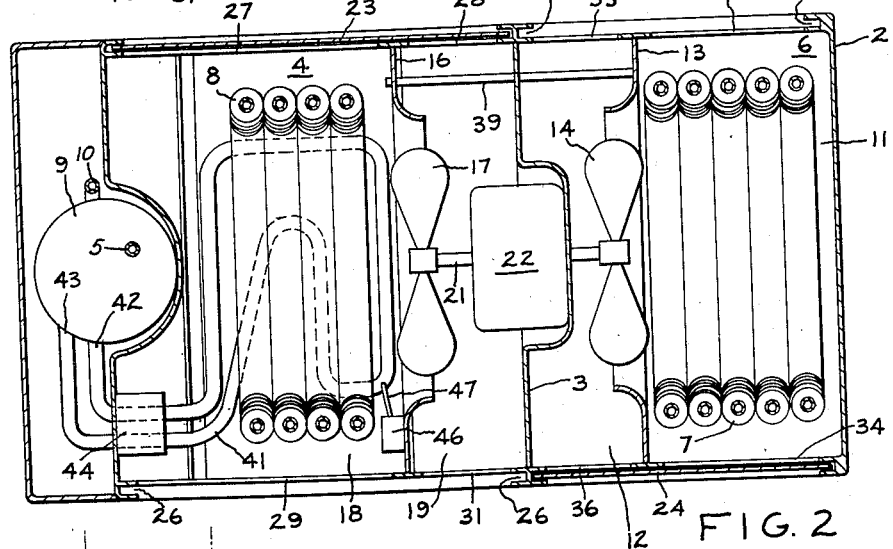
FIG. 2
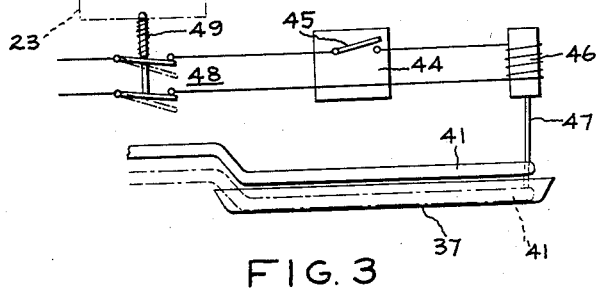
FIG. 3
INVENTOR.
GEORGE E. STOCKING
BY
HIS ATTORNEY United States Patent Office
2,911,797
Patented Nov. 10, 1959

2,911,797
AIR CONDITIONING APPARATUS

George E. Stocking, Lyndon, Ky., assignor to General Electric Company, a corporation of New York Application November 10, 1958, Serial No. 772,811

5 Claims. (Cl. 62—176)

The present invention relates to air conditioning apparatus for heating and cooling air from an enclosure and more particularly to an improved arrangement in such an apparatus for promoting automatic humidification of the air of the enclosure when the air conditioning apparatus is used to heat the enclosure.

As far as the human body is concerned, air temperature, relative humidity and air motion act together to produce the sensation of warmth or cold. Much has been done toward the attainment of the proper air temperature and air motion within a conditioned enclosure. Also, much has been done, during the warm or summer months of the year, to reduce the moisture content of the air and to maintain a satisfactory relative humidity for the attainment of comfort conditions for the occupants of the room or enclosure. However, during the winter or heating months of the year, present day heating systems do little toward the attainment of proper conditions of relative humidity for the comfort of the occupants within a heated enclosure. When the outdoor temperature falls, the amount of moisture in the air also normally drops. Therefore, indoors, where the temperature is maintained high, the relative humidity of the air, which normally has approximately the same moisture content as the outdoor air, is generally too low for comfort conditions. It has been determined that the most desirable comfort conditions lie in the relative humidity range between 30 and 70 percent. For values much below 30%, the mucous membranes and the skin surface become too dry for comfort while for values above the neighborhood of 70% there is a tendency to develop a sticky or clammy sensation.

While humidification of the air presents a problem in many heating systems, one of the main difficulties in the design of self-contained air conditioning units, using a refrigeration system for both heating and cooling air within an enclosure, is that of providing suitable means for disposing of the water which condenses out of the air onto the cooling coil. This problem is particularly troublesome during the heating season, since this water must be disposed of in order to prevent its freezing and damaging portions of the air conditioning unit. By properly designing the unit, this condensate water, or at least a good portion of it, could be added to the room air thus relieving the condensate disposal problem and providing humidification of the room air.

Accordingly, it is an object of the present invention to provide an improved arrangement in an air conditioning apparatus for maintaining the moisture content of the air within an enclosure within proper range during operation of the unit on the heating cycle.

It is another object of the present invention to utilize, in an air conditioning unit having a refrigeration system for heating an enclosure, the water removed from the air stream flowing over the evaporator to humidify the air circulated from the room through the condenser.

It is a more specific object of the present invention to provide an improved air conditioning apparatus having an arrangement therein for humidifying the air flowing through the unit during the heating cycle, which arrangement also facilitates the cooling of the compressor motor.

Further objects and advantages of the invention will become apparent as the following description proceeds and the features of novelty which characterize the invention will be pointed out with particularity in the claims annexed to and forming a part of this specification.

In accordance with the present invention, there is provided an air conditioning apparatus of the type adapted to be mounted in the wall of an enclosure and including an outer casing housing a refrigeration system including an evaporator, a compressor and a condenser connected in refrigerant flow relationship. Means are provided within the casing for circulating a first stream of air in thermal exchange with the condenser and for circulating a second stream of air in thermal exchange with the evaporator. A condensate sump is provided for collecting condensate water condensed out of the air circulated over the evaporator and is exposed to the condenser air stream. In order to promote the humidification of air circulating through the unit when inside air is circulated over the condenser during the heating cycle, there is provided a heat exchange coil adapted to carry hot refrigerant gas therethrough and so arranged with respect to the condensate sump as to permit its being raised from or lowered into the sump. Suitable means are provided for raising or lowering the heat exchange coil with respect to the condensate sump according to humidity conditions sensed by a humidistat arranged in the air stream circulated over the condenser. During low humidity conditions, the coil is lowered into the condensate sump to heat the condensate water and thereby increase the vaporization of the water into the air stream flowing over the condenser and, during the high humidity conditions, the coil is raised from the condensate sump to reduce the amount of vaporization of the condensate water into the air flowing over the condenser.

In order to more fully understand the invention, reference may be had to the accompanying drawing in which:

Fig. 1 is an elevation view in somewhat diagrammatic form showing an air conditioning apparatus incorporating the present invention;

Fig. 2 is a plan view in somewhat diagrammatic form illustrating the humidifying arrangement of the present invention; and Fig. 3 is a line diagram illustrating schematically one arrangement for controlling the movement of the heat exchange coil according to the humidity of the air entering the condenser of the unit;

Referring now to Fig. 1, there is shown an air conditioning unit including a casing 2 adapted to be mounted in an aperture or a window in the wall of an enclosure with one side of the casing facing the enclosure and the other side of the casing exposed to the outdoors. The casing is divided by a barrier 3 into two separate compartments hereinafter designated the condenser compartment 4 and the evaporator compartment 6. Within the casing is a refrigeration system including a condenser 8, an evaporator 7, and a compressor 9 connected in refrigerant flow relationship. The evaporator 7 is disposed in the evaporator compartment 6 while the condenser 8 and the compressor 9 are both mounted in the condenser compartment 4. High pressure refrigerant gas is delivered from the compressor 9 to the condenser 8 through the discharge tube 5 and low pressure refrigerant gas is drawn back into the compressor 9 from the evaporator 7 through the suction tube 10. During operation, the evaporator 7 always removes heat from the air within the evaporator compartment 6 while the condenser 8 discharges heat to the air within the condenser compartment 4.

The evaporator compartment 6 is substantially divided into inlet and outlet sections 11 and 12 respectively by a fan shroud 13 and a fan 14 which also provides air circulation through the evaporator compartment 6. Air is always circulated within the evaporator compartment 6 from the inlet section 11 to the outlet section 12. Similarly, the condenser compartment 4 is substantially divided by a shroud 16 and a fan 17 into condenser compartment inlet and outlet sections 18 and 19. The condenser fan 17 is arranged to circulate air through the condenser compartment in the direction from the condenser compartment inlet section 18 to the outlet section 19. In the illustrated embodiment of the invention, both of the fans 14 and 17 are rotated by a shaft 21 driven by the motor 22 mounted on the barrier 3 and extending into the condenser compartment 4 of the casing.

It can be seen that all of the heat producing members of the unit are located in the condenser compartment 4. More specifically, the compressor 9, condenser 8, and the fan motor 22 are all mounted so that the heat produced by these members is transferred to air circulated within the condenser compartment 4. This arrangement is advantageous because it permits full utilization of the heating and cooling capacities of the components within the separate compartments.

Referring now to Fig. 2, there is shown a pair of air baffles or air valves 23 and 24 arranged respectively across the openings to the condenser and evaporator compartments 4 and 6 respectively. The air baffles or air valves 23 and 24 are arranged to slide in grooves or slots 26 at the extremities of the compartments and to close the outlets and inlets to the respective compartments. Thus, as seen in Fig. 2, the air valve 23, when arranged as shown in Fig. 2, closes the inlet opening 27 and closes the outlet opening 28 to the condenser compartment. When the air valve 23 is placed in the position shown in Fig. 2 air enters the condenser compartment 4 through the inlet opening 29 and is discharged through the outlet opening 31. With the air valve 24 placed in the position shown in Fig. 2, air enters the evaporator compartment 6 through the inlet opening 32 and is discharged through the outlet opening 33. If the baffle 24 were placed on the opposite side of the casing to close the openings 32 and 33 air would be circulated through the evaporator compartment 6 through the inlet opening 34 and discharged through the outlet opening 36; and similarly, if the baffle plate 23 was placed on the opposite side of the casing air would be circulated through the condenser compartment through the inlet opening 27 and discharged through the outlet 28.

With the side of the casing containing the openings 27, 28, 32 and 33 arranged to face the outdoors and with the baffles 23 and 24 arranged as in Fig. 2, the unit is operated to heat the air within the enclosure. Air from the enclosure is circulated through the condenser compartment and removes heat from the condenser 8, compressor 9 and the fan motor 22 and is discharge back into the enclosure to warm the enclosure. Outdoor air is circulated through the evaporator compartment 6 where it gives up heat to the evaporator 7 and is discharged to the outdoors again through the outlet opening 33. The refrigerant flowing through the system delivers the heat removed from the outdoor air at the evaporator to the condenser. Suitable means such as an expansion valve or a capillary 35 is provided between the condenser and the evaporator for producing a pressure drop in the refrigerant between these two members.

As will now be explained the present invention deals with an arrangement for automatically providing humidification of the air flowing through the condenser compartment 4 when the air conditioner is operating to heat air from the enclosure. Moisture from the air flowing through the evaporator compartment 6 is continually condensed out of the air and deposited on the evaporator and components within this compartment. Means are provided in the bottom of the evaporator compartment 6 for collecting this condensed moisture and delivering it to a sump 37 formed in the bottom of the condenser compartment 4. As may be seen in Fig. 1, a condensate collection tray 38 is disposed directly beneath the evaporator 7. All portions of this tray slant in a direction toward a drain located centrally within the tray and which connects with the sump 37 through an insulated tube 39. Condensate water is delivered from the tray 38 through the tube 39 to the sump 37 in the bottom of the condenser compartment.

In order to humidify the air flowing through the condenser compartment, there is provided a heat exhange coil or vaporizer coil 41 which is connected in the refrigeration system and adapted to carry hot refrigerant gas therethrough. This coil 41 is so disposed with respect to the condensate sump 37 that it may be raised from or lowered into the condensate water collected in the sump. In the illustrated embodiment of the invention, the heat exchange coil 41 is connected with respect to the compressor 9 such that compressed super-heated refrigerant gas is discharged directly into the coil at the coil inlet 42. The hot, compressed gas passes through the heat exchange coil 41 and gives up a portion of its heat to the medium surrounding the coil 41 and, after having been partially cooled, the refrigerant gas is then discharged back through the tubing 43 into the upper portion of the motor case to cool the motor. The length of the lines 42 and 43 is sufficient to provide enough flexibility to permit the coil 41 to be raised or lowered with respect to the sump. By lowering the heat exchange coil 41 into the water collected in the condensate sump 37, the heat from the hot compressed gas flowing through the coil 41 is utilized to raise the temperature of this water and facilitate the vaporization of this water into the air flowing through the condenser compartment 4 whereupon it is carried by this air into the enclosure. By raising the heat exchange coil 41 out of the condensate sump, the condensate water is no longer heated by the coil and the vaporization of the water is greatly reduced.

In order to control the amount of humidification of the air within the enclosure and to maintain the relative humidity of the air within the enclosure at a proper percentage, such as between 30 and 70 percent, there is provided a humidistat 44 which is located adjacent the inlet opening 29 of the condenser compartment. The humidistat 44 senses the moisture conditions of the air entering the inlet 29 and energizes or de-energizes a means for raising or lowering the heat exchanged coil 41 with respect to the condensate sump 37. The humidistat 44 may be any of the well known types of humidity sensing devices now on the market for sensing relative humidity conditions so long as it includes a switch or other device for energizing an electrical circuit to operate the means for raising or lowering the heat exchange coil. Means such as a heat motor, a solenoid, an electrical motor or other driver is attached to the heat exchange coil and lifts the coil 41 out of the water according to moisture conditions of the entering air stream, as sensed by the humidistat 44.

Referring now to Fig. 3 in the illustrated embodiment of the invention, the humidistat 44 is provided with a switch 45 which, when closed, energizes a solenoid 46. A linkage 47, connecting between the coil 41 and the solenoid 46, raises the coil 41 out of the water in the sump as indicated in full lines in Fig. 3. Whenever the air entering the condenser compartment 4 is above a predetermined level or percentage of relative humidity, the humidistat energizes the solenoid 46 to lift the coil 41 out of the condensate sump thereby reducing the amount of vaporization of water within the condensate sump. Whenever the relative humidity of the air entering the condenser compartment 4, drops below a predetermined level or predetermined percentage of relative humidity, then the humidistat 44 opens the switch 45 and de-energizes the solenoid permitting the coil 41 to be lowered into the condensate sump 37, as shown in dotted lines in Fig. 3. The coil then heats the condensate water in the condensate sump and promotes the vaporization of this water. Some humidistats, now available on the market are provided with means for adjusting the relative positions of the components therein to permit selection of any desirable percentage of relative humidity. It is contemplated that this type of humidistat can be used thereby permitting the occupents of the enclosure to select a desirable level of relative humidity for their comfort conditions.

During the summer or cooling season the air conditioner is operated to cool the enclosure and the air baffle 24 is moved to close the openings 32 and 33 in the evaporator compartment and the air baffle 23 is moved to close the openings 29 and 31 in the condenser compartment. Under most circumstances when the unit is operated to cool the enclosure, the air passing through the condenser compartment 4 and over the humidistat 44 is sufficiently humid to cause the humidistat to energize the solenoid 47 such that it raises the coil 41 out of the condensate water. In the summer or cooling season, it is desirable in order to dispose of the condensate water, to maintain the heat exchange coil 41 continuously submerged in the condensate water regardless of the humidity of the air flowing over the humidistat. In order to accomplish this there is provided a switch 48 which is actuated to open the circuit to the humidistat and the solenoid 46 whenever the air valve 23 is placed in position to close the openings 29 and 31 to the condenser compartment 4. More specifically, as may be seen schematically in Fig. 3, the air valve 23 depresses a plunger 49 which in turn opens contacts of the switch 48 thereby de-energizing the humidistat 44 and the solenoid 46. With the current to the humidistat and the solenoid 47 interrupted, the coil is continuously lowered into the condensate sump 37 and continuously heats the water therein.

There may be some extreme weather conditions during both the heating or cooling seasons in which the condensate water in the condensate sump will not be evaporated at a fast enough rate from the condensate sump. In the event that the condensate drains into the condensate sump 37 at a faster rate than it can be evaporated therefrom, the excess condensate is drained to the outside through an overflow drain 51. However, under conditions of normal operation, the drain 51 is rarely used and is provided solely as a safety feature. Obviously, this drain 51 can be connected to other drainage means to carry the overflow from the condensate sump 37 to other areas than to the outside.

While in the illustrated embodiment of the invention, the heat exchange coil 41 has been shown as a coil connecting with the compressor for removing the superheat from the refrigerant gas of the compressor, obviously other hot gas carrying coils can be used for this purpose. The heat exchange coil could be very easily formed as a part of the condenser itself. That is, the heat exchange coil 41 does not necessarily have to discharge back into the compressor case 9. Instead the coil 41 could be arranged such that the gas from the coil is directed into the condenser 8, rather than being passed back into the compressor case 9 to cool the motor. The utilization of the de-super heat coil, as shown in the illustrated embodiment of the invention, is one manner in which the excess heat of compression may be utilized to vaporize the condensate water and the cooled gas is then utilized to cool the compressor motor, thus attaining both of these functions through a single coil. In those types of compressors utilizing a low side case or a system in which the suction gas from the evaporator is discharged directly into the case to cool the motor, it would be impractical to discharge the gas from the coil 41 back into the compressor case. In this type of arrangement, it would be more desirable to use a heat exchange coil or vaporization coil which was a part of the condenser 8 and to discharge the gas from the coil directly into the remaining portions of the condenser.

By the present invention there has been provided an improved air conditioning unit having arrangement for automatically humidifying the air flowing through the condenser compartment when this air is used to heat an enclosure. Moreover, this arrangement provides a means for disposing of the condensate water during operation of the unit both for heating or cooling an enclosure and provides a convenient arrangement for cooling the motor of a compressor utilizing a high side case.

While in accordance with the patent statutes there has been described what at present is considered to be the preferred embodiment of the invention, it will be understood by those skilled in the art that various changes and modifications may be made therein without departing from the invention, and it is therefore, the aim of the appended claims to cover all such changes and modifications as fall within the true spirit and scope of the invention.

What I claim as new and desire to secure by Letters Patent of the United States is:

1. An air conditioning unit of the type adapted to be mounted in the wall of an enclosure to be conditioned comprising a casing, a refrigeration system in said casing including an evaporator, a compressor and a condenser connected in refrigerant flow relationship, means for circulating a first stream of air in thermal exchange with said condenser, means for circulating a second stream of air in thermal exchange with said evaporator, a condensate sump also exposed to said first air stream, means for delivering condensate water condensed out of the air by said evaporator to said condensate sump, a heat exchange coil in said system adapted to carry hot refrigerant gas therethrough, said heat excahnge coil being disposed with respect to said condensate sump in a manner to be raised from or lowered into said sump, humidistat means for sensing the humidity of said first air stream flowing in thermal exchange with said condenser, means energized by said humidistat means for raising or lowering said heat exchange coil according to the humidity conditions of said air stream flowing in thermal exchange with said condenser so that during low humidity conditions said coil is lowered into said condensate sump to heat said condensate water to increase the vaporization thereof and during high humidity conditions said coil is raised from said condensate sump to reduce the amount of vaporization of said condensate water collected therein.

2. An air conditioning unit of the type adapted to be mounted in the wall of an enclosure to be conditioned comprising a casing, a refrigeration system in said casing including an evaporator, a compressor and a condenser connected in refrigerant flow relationship, a motor for driving said compressor, a sealed motor-compressor housing, means for circulating a first stream of air in thermal exchange with said condenser, means for circulating a second stream of air in thermal exchange with said evaporator, a condensate sump also exposed to said first air stream, means for delivering condensate water condensed out of the air by said evaporator to said condensate sump, a heat exchange coil forming a part of said refrigeration system and disposed with respect to said condensate sump in a manner to be raised from or lowered into said sump, means for conveying compressed refrigerant from said compressor into said heat exchange coil, means for conveying the refrigerant leaving said heat exchange coil into said motor-compressor housing for cooling said motor, humidistat means for sensing the humidity of air flowing into said condenser compartment from said enclosure, means energized by said humidistat means for raising or lowering said heat exchange coil according to humidity conditions of said first air stream flowing in thermal exchange with said condenser so that during low humidity conditions said heat exchange coil is lowered into said condensate sump to heat said condensate water and increase the vaporization thereof and during high humidity conditions said coil is raised from said condensate sump to reduce the amount of vaporization of said condensate water collected therein.

3. An air conditioning unit of the type adapted to be mounted in the wall of an enclosure for heating or cooling air from within the enclosure comprising a casing, a refrigeration system in said casing including an evaporator, a compressor and a condenser connected in refrigerant flow relationship, means for circulating a stream of air from within said enclosure in thermal exchange with said evaporator while circulating a stream of air from outside the enclosure in thermal exchange with said condenser, means for circulating a stream of air from said enclosure in thermal exchange with said condenser while circulating a stream of air from the outside in thermal exchange with said evaporator, a condensate sump also exposed to said air stream circulating in thermal exchange with said condenser, means for delivering condensate water condensed out of the air by said evaporator to said condensate sump, a heat exchange coil in said system adapted to carry hot refrigerant gas therethrough, said heat exchange coil being disposed with respect to said condensate sump in a manner to be raised from or lowered into said sump, humidistat means for sensing the humidity of air flowing in thermal exchange with said condenser, means energized by said humidistat means only when said unit is operating to heat said enclosure for raising or lowering said heat exchange coil according to the humidity conditions of air flowing in thermal exchange with said condenser so that during low humidity conditions said coil is lowered into said condensate sump to heat said condensate water to increase the vaporization thereof and during high humidity conditions said coil is raised from said condensate sump to reduce the amount of vaporization of said condensate water collected therein.

4. An air conditioning unit of the type adapted to be mounted in the wall of an enclosure for heating and cooling air from said enclosure comprising a casing, a refrigeration system in said casing including an evaporator, a compressor and a condenser connected in refrigerant flow relationship, a motor for driving said compressor, a sealed housing for said compressor and said compressor drive motor, means for circulating a stream of air from said enclosure in thermal exchange with said evaporator while circulating a stream of outside air in thermal exchange with said condenser, means for circulating a stream of air from said enclosure in thermal exchange with said condenser while circulating a stream of outside air in thermal exchange with said evaporator, a condensate sump also exposed to said air stream circulating in thermal exchange with said condenser, means for delivering condensate water condensed out of the air by said evaporator to said condensate sump, a heat exchange coil in said system, means for conveying compressed refrigerant leaving said compressor into said heat exchange coil, means for conveying refrigerant leaving said heat exchange coil into said motor and compressor housing, said heat exchange coil being disposed with respect to said condensate sump in a manner to be raised from or lowered into said sump, humidistat means for sensing the humidity of air flowing in thermal exchange with said condenser, means energized by said humidistat means for raising or lowering said heat exchange coil according to the humidity conditions of air flowing in thermal exchange with said condenser so that during low humidity conditions said coil is lowered into said condensate sump to heat condensate water and increase the vaporization thereof and during high humidity conditions said coil is raised from said condensate sump to reduce the amount of vaporization of said condensate water collected therein, and means for disconnecting said means for raising or lowering said heat exchange coil when said air conditioning unit is operating to cool said enclosure so that said exchange coil is continuously lowered into said condensate sump thereby to heat said condensate water for vaporization thereof and to cool the refrigerant flowing through said heat exchange coil.

5. An air conditioning unit of the type adapted to be mounted in the wall of an enclosure for heating and cooling air from the enclosure comprising a casing, a refrigeration system in said casing including an evaporator, a compressor and a condenser connected in refrigerant flow relationship, a motor for driving said compressor, a sealed housing for said compressor and said compressor drive motor, means for circulating a first stream of air in thermal exchange with said condenser, a first baffle selectively movable to direct said first stream of air from inside or from outside said enclosure, means for circulating a second stream of air in thermal exchange with said evaporator, a second baffle selectively movable to direct said second stream of air from inside or from outside said enclosure, a condensate collecting sump also exposed to said first air stream, means for delivering condensate water condensed out of the air by said evaporator to said condensate sump, a heat exchange coil in said system, means for conveying compressed refrigerant leaving said compressor into said heat exchange coil, means for conveying refrigerant leaving said heat exchange coil into said motor and compressor housing, said heat exchange coil being disposed with respect to said condensate sump in a manner to be raised from or lowered into said condensate sump, humidistat means for sensing the humidity of said first air stream flowing in thermal exchange with said condenser, a solenoid energized and de-energized by said humidistat means according to the humidity conditions of air flowing in thermal exchange with said condenser, said solenoid connecting with said heat exchange coil for raising said heat exchange coil upon being energized and for lowering said heat exchange coil upon being de-energized so that during low humidity conditions said coil is lowered into said condensate sump to heat condensate water and increase the vaporization thereof and during high humidity conditions said coil is raised from said condensate sump to reduce the amount of vaporization of said condensate water collected therein, and a switch for interrupting the current to said solenoid when said first baffle is positioned to circulate outside air in thermal exchange with said condenser.

References Cited in the file of this patent
UNITED STATES PATENTS

| | | |
|---|---|---|
| 2,309,224 | Terry | Jan. 26, 1943 |
| 2,355,289 | Gibson | Aug. 8, 1944 |